US008205075B2

(12) United States Patent
Moriai et al.

(10) Patent No.: US 8,205,075 B2
(45) Date of Patent: Jun. 19, 2012

(54) AUTHENTICATION DEVICE AND METHOD

(75) Inventors: Shiho Moriai, Kanagawa (JP); Muneki Shimada, Tokyo (JP); Kyoji Shibutani, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1119 days.

(21) Appl. No.: 11/596,022

(22) PCT Filed: Mar. 23, 2005

(86) PCT No.: PCT/JP2005/005997
§ 371 (c)(1),
(2), (4) Date: Jul. 12, 2007

(87) PCT Pub. No.: WO2005/109746
PCT Pub. Date: Nov. 17, 2005

(65) Prior Publication Data
US 2007/0294535 A1    Dec. 20, 2007

(30) Foreign Application Priority Data
May 10, 2004   (JP) ................................. 2004-140483

(51) Int. Cl.
*G06F 21/00* (2006.01)
(52) U.S. Cl. .......... 713/160; 713/161; 713/176; 380/28; 709/225; 726/22
(58) Field of Classification Search .................. 713/161, 713/201, 160
See application file for complete search history.

(56) References Cited

U.S. PATENT DOCUMENTS

| 6,108,583 | A  | * | 8/2000  | Schneck et al. ................... 700/9 |
| 6,516,412 | B2 | * | 2/2003  | Wasilewski et al. .......... 713/168 |
| 6,560,340 | B1 | * | 5/2003  | Akins et al. .................... 380/239 |
| 7,296,148 | B2 | * | 11/2007 | Sakaguchi .................... 713/160 |
| 7,373,506 | B2 |   | 5/2008  | Asano et al. |
| 7,434,052 | B1 | * | 10/2008 | Rump ........................... 713/171 |
| 7,624,263 | B1 | * | 11/2009 | Viswanath et al. ........... 713/151 |
| 7,627,753 | B2 |   | 12/2009 | Whitten et al. |

(Continued)

FOREIGN PATENT DOCUMENTS

EP    1195734 A1    4/2002

(Continued)

OTHER PUBLICATIONS

Schwartz et al., "Smart packets: applying active networks to network management", ACM Transactions on Computer Systems (TOCS), vol. 18 Issue 1, Feb. 2000.*

(Continued)

*Primary Examiner* — Taghi Arani
*Assistant Examiner* — Morshed Mehedi
(74) *Attorney, Agent, or Firm* — Matthew B. Dernier, Esq.; Gibson & Dernier LLP

(57) ABSTRACT

Provided is an authentication system capable of identifying a cause of a failure when authentication fails. A data structure of data to be authenticated has a header authentication data area (D2), and an authentication data area (D4) in addition to a header area (D1) and a data area (D3). The header authentication data area (D2) authenticates validity of the header area (D1), and the authentication data area (D4) authenticates the validity of the header authentication header area (D2) and the data area (D3). Since two kinds of authentication are carried out, the cause of the failure in authentication can be identified easily when authentication is failed.

15 Claims, 7 Drawing Sheets

U.S. PATENT DOCUMENTS

| | | | |
|---|---|---|---|
| 7,783,765 B2 | 8/2010 | Hildebrand et al. | |
| 2002/0002676 A1* | 1/2002 | Kawasaki et al. | 713/161 |
| 2002/0169971 A1 | 11/2002 | Asano et al. | |
| 2003/0182574 A1* | 9/2003 | Whitten et al. | 713/201 |
| 2004/0103202 A1 | 5/2004 | Hildebrand et al. | |
| 2004/0123109 A1* | 6/2004 | Choi | 713/176 |
| 2004/0139339 A1* | 7/2004 | Yeh et al. | 713/193 |
| 2004/0143734 A1* | 7/2004 | Buer et al. | 713/153 |
| 2004/0162980 A1* | 8/2004 | Lesenne et al. | 713/153 |
| 2004/0193876 A1* | 9/2004 | Donley et al. | 713/162 |
| 2005/0152538 A1* | 7/2005 | Stedron et al. | 380/28 |

FOREIGN PATENT DOCUMENTS

| | | |
|---|---|---|
| EP | 1320012 A2 | 6/2003 |
| EP | 1346755 A2 | 9/2003 |
| JP | 2001-223735 | 8/2001 |
| JP | 2003-337632 | 11/2003 |

OTHER PUBLICATIONS

Office Action for corresponding European Application No. 05721646.7-2415, Nov. 14, 2011.
The Security of Computer Communication, The Green Publishing Company, pp. 499-526, Jan. 20, 2002.
Korean Office Action dated Dec. 13, 2007 and English translation.
Supplementary European Search Report for corresponding PCT Application No. PCT/JP2005/005997, May 16, 2011.
Franks J, et. al. "HTTP Authentication Basic and Digest Access Authentication; draft-ietf-http-authentication-03.txt" IETF Standard-Working-Draft, Internet Engineering Task Force, IETF, CH, vol. http, No. 3, Sep. 2, 1998, pp. 1-31.
International Search Report.
English language Abstracts of JP2003-337632A and JP2001-223735A.

* cited by examiner

AUTHENTICATION DEVICE AND METHOD

TECHNICAL FIELD

The present invention relates to an authentication technology.

BACKGROUND OF THE INVENTION

Authentication is often performed on data to be communicated (the term "communicate" or "communication" in this specification includes, in addition to data exchange between different devices, data exchange between chips or other components within the same device, and data exchange between a recording medium and a device) in order to, for example, check validity of data, and prevent data alteration or spoofing.

A common way to perform authentication is as follows.

That is, when authentication is necessary, data to be communicated has a data structure including a header area, a data area that contains digital information as a substantial object of the communication, and an authentication data area that contains authentication data used for authentication of the data area.

Authentication data contained in the authentication data area of this data structure is generated by performing a given algorithm operation on digital information contained in the data area. The header area of this data structure contains information for identifying an algorithm used for creating authentication data or data needed to create the authentication data (in some cases, the algorithm itself). Information about data length and sequence number may also be contained if necessary.

A device which has received data having this data structure performs an algorithm operation on digital information contained in the data area by way of an algorithm that is identified from information contained in the header area of the received data. The result of the operation is compared with authentication data contained in the authentication data area. When the two are found to be a match as a result of the comparison, the device judges that the received data is valid or complete, whereas the device judges that the received data is invalid or incomplete when the two do not match.

This and similar authentication methods have come into wide use and been effective to a certain degree. However, there is room for improvement to those authentication methods.

In the above-mentioned authentication method, the following conditions have to be met for successful authentication in which the received data is judged to be valid or complete.

(1) No alteration or the like has been made to information contained in the header area of the received data, i.e., data length information or information for identifying what algorithm is used to create authentication data.

(2) No alteration or the like has been made to the data area.

(3) No error is made in an algorithm operation performed on digital information in the data area by an algorithm that is identified from the information contained in the header area of the received data.

Accordingly, authentication fails if even one of the conditions (1) to (3) is not fulfilled and, when authentication fails, there is no way of specifying which one of (1) to (3) is the cause.

If the cause of an authentication failure can be identified, for example, if it can be specified that the unfulfilment of (3) has caused an authentication failure, there is no need to obtain the data again and a reattempt at authentication can be processed efficiently. If the cause of an authentication failure cannot be identified, on the other hand, every processing step that is necessary for authentication has to be performed all over again for a reattempt at authentication.

An object of the present invention is to provide a technique for making it possible to identify the cause of an authentication failure.

DISCLOSURE OF THE INVENTION

In order to achieve the above-mentioned object, the present invention provides two embodiments.

The first embodiment provides a data structure of data to be communicated in a communication, including: a data area for containing digital information that is a substantial object of the communication; a header area attached to the data area at a head of the data to be communicated; a header authentication data area for containing header authentication data used for authentication of the header area; and an authentication data area for containing authentication data used for authentication of the data area and the header authentication data area, in which the header area contains a second algorithm information that is information for identifying an algorithm for a given algorithm operation that is performed to authenticate the data area using the authentication data.

The second embodiment provides a data structure of data to be communicated in a communication, including: a data area for containing digital information that is a substantial object of the communication; a header area attached to the data area at a head of the data to be communicated; a header authentication data area for containing header authentication data used for authentication of the header area; and an authentication data area for containing authentication data used for authentication of the data area, in which the header area contains a second algorithm information that is information for identifying an algorithm for a given algorithm operation that is performed to authenticate the data area using the authentication data.

The first embodiment and the second embodiment each have a header authentication data area for containing header authentication data. Header authentication data is for authentication of a header area. The first embodiment and the second embodiment each have an authentication data area for containing authentication data. Authentication data in the first embodiment is for authentication of a data area and of a header authentication data area. Authentication data in the second embodiment is for authentication of a data area.

Receiving data with a data structure of the first invention, a device can perform authentication of the header area separately from authentication of the data area and of the header authentication data area. Receiving data with the data structure of the second invention, a device can perform authentication of the header area separately from authentication of the data area. A device that receives data with such the data structure can therefore specify whether an alteration or the like is made to the header area or other areas than the header area when authentication of the data fails.

With the data structure according to the first embodiment or the second invention, the cause of an authentication failure can be identified. This contributes to raise the efficiency in, for example, retrying authentication processing.

The second algorithm information in the first embodiment and the second embodiment may be information for identifying a second algorithm (e.g., a code specifying a calculation method that is defined by a unified standard), or may be a second algorithm itself.

Data with the data structure according to the first embodiment or the second embodiment has a header area, a data area, a header authentication data area, and an authentication data area in sequence. The sequence is headed by the header area. The data area, the header authentication data area, and the authentication data area follow the header area in an arbitrary order.

The header authentication data area may be positioned immediately after the header area, for example. This is convenient since a device receiving data with the data structure of the first embodiment or the second embodiment can perform authentication on the header area as soon as the header area and the header authentication data area are received. For instance, when the authentication of the header area fails, the device can stop obtaining the subsequent areas of the data. This makes it possible to avoid loading data from the data area when an invalid code such as a virus is contained within the data area, and thereby prevent the invalid code from infiltrating the device performing authentication.

The header area of data with the data structure according to the first embodiment or the second embodiment may record information about the data length of the data area. This enables a device receiving the data to know where the data area starts and ends in performing authentication on the data area. The header area of data with a data structure according to the first embodiment or the second embodiment may contain at least one of information about the data length of the header area, information about the data length of the header authentication data area, and information about the data length of the authentication data area. Data indicating a break point between different kinds of data may be buried at the heads or tails of the header area, the header authentication data area, the data area, and the authentication data area, so that a device receiving the data can know where the data area starts and ends in performing authentication on the data area.

The header area of data with the data structure according to the first embodiment or the second embodiment may contain a first algorithm information, which is information for specifying what algorithm is employed in a given algorithm operation when authentication using the header authentication data is performed on the header area. When a first algorithm used in a device that performs authentication is determined in advance, there is no need to bury information for identifying the first algorithm in the header area. The first algorithm information in the first embodiment and the second invention, if it is needed to be contained in the header area, may be information for identifying the first algorithm (e.g., a code specifying a calculation method that is defined by a unified standard), or may be the first algorithm itself.

Data with the data structure according to the first embodiment and data with the data structure according to the second embodiment can be created by, for example, devices described below.

The data with the data structure according to the first embodiment can be created using a data processing device for processing data that has a data area for containing digital information as a substantial object of a communication, including: means for creating data of a header area attached to the data area at a head of the data to be communicated; means for creating data of a header authentication data area based on data that is contained in the header area and a first algorithm with which a given algorithm operation is performed on this data, the header authentication data area data being used for authentication of the header area; means for creating authentication data used for authentication of the data area and the header authentication data area, based on data that is contained in the data area and the header authentication data area and a second algorithm with which a given algorithm operation is performed on this data; and integrating means for integrating the digital information, the header area data, the header authentication data, and the authentication data to constitute the data area, the header area, the header authentication data area, and the authentication data area, respectively, with the header area placed at a head of the integrated data, in which the means for creating data of the header area makes the header area data contain a second algorithm information that is information for identifying the second algorithm.

The data with the data structure according to the second embodiment can be created using a data processing device for processing data that has a data area for containing digital information as a substantial object of a communication, including: means for creating data of a header area attached to the data area at a head of the data to be communicated; means for creating data of a header authentication data area based on data that is contained in the header area and a first algorithm with which a given algorithm operation is performed on this data, the header authentication data area data being used for authentication of the header area; means for creating authentication data used for authentication of the data area, based on data that is contained in the data area and a second algorithm with which a given algorithm operation is performed on this data; and integrating means for integrating the digital information, the header area data, the header authentication data, and the authentication data to constitute the data area, the header area, the header authentication data area, and the authentication data area, respectively, with the header area placed at a head of the integrated data, in which the means for creating data of the header area makes the header area data contain a second algorithm information that is information for identifying the second algorithm.

The integrating means in these data processing devices may place the header authentication data area right behind the header area. Data created by such data processing devices has a data structure in which the header authentication data area immediately follows the header area. In this case, the means for creating header area data in the data processing devices may create data of specific size for the header area. By thus fixing the data length of the header area, in other words, by giving the header area a pre-arranged data length, the need is eliminated for the header area to contain information about the data length of the header area, and the header area data length is prevented from being faked. It also fixes the start point of the data area, thereby facilitating prevention of alteration of the data area.

The means for creating header area data in the data processing devices may record information about the data length of the data area in data of the header area. This means may make the header area contain at least one of information about the data length of the header area, information about the data length of the header authentication data area, and information about the data length of the authentication data area. The means for creating the header area, the means for creating the header authentication data area, the means for creating the data area, and the means for creating the authentication data area in the data processing devices may each bury data that indicates a break point between different kinds of data at the head or tail of data it creates.

In each of the above data processing devices, the means for creating header area data may make the header area contain a first algorithm information, which is information for specifying what algorithm is used in a given algorithm operation when authentication using the header authentication data is performed on the header area.

Data with a data structure according to the first embodiment and data with a data structure according to the second embodiment can be created by, for example, methods described below.

The data with the data structure according to the first embodiment can be created using a data processing method executed in a data processing device for processing data that has a data area for containing digital information as a substantial object of a communication, including the steps of: creating, by the data processing device, data of a header area attached to the data area at a head of the data to be communicated; creating, by the data processing device, data of a header authentication data area based on data that is contained in the header area and a first algorithm with which a given algorithm operation is performed on this data, the header authentication data area data being used for authentication of the header area; creating, by the data processing device, authentication data used for authentication of the data area and the header authentication data area, based on data that is contained in the data area and the header authentication data area and a second algorithm with which a given algorithm operation is performed on this data; and integrating, by the data processing device, the digital information, the header area data, the header authentication data, and the authentication data to constitute the data area, the header area, the header authentication data area, and the authentication data area, respectively, with the header area placed at a head of the integrated data, in which, in the step of creating data of the header area, a second algorithm information that is information for identifying the second algorithm is contained in the header area data.

The data with the data structure according to the second embodiment can be created using a data processing method executed in a data processing device for processing data that has a data area for containing digital information as a substantial object of a communication, including the steps of: creating, by the data processing device, data of a header area attached to the data area at a head of the data to be communicated; creating, by the data processing device, data of a header authentication data area based on data that is contained in the header area and a first algorithm with which a given algorithm operation is performed on this data, the header authentication data area data being used for authentication of the header area; creating, by the data processing device, authentication data used for authentication of the data area, based on data that is contained in the data area and a second algorithm with which a given algorithm operation is performed on this data; and integrating, by the data processing device, the digital information, the header area data, the header authentication data, and the authentication data to constitute the data area, the header area, the header authentication data area, and the authentication data area, respectively, with the header area placed at a head of the integrated data, in which, in the step of creating data of the header area, a second algorithm information that is information for identifying the second algorithm is contained in the header area data.

The above-mentioned devices which create the data with the data structure according to the first embodiment and the data with the data structure according to the second embodiment may be dedicated devices. Alternatively, general-purpose computers can serve as these devices when, for example, computer programs described below are employed.

The above-mentioned device for creating the data with the data structure according to the first embodiment can be manufactured using the following computer program. That is, there is provided a computer program for causing a computer to function as a data processing device for processing data that has a data area for containing digital information as a substantial object of a communication, in which the computer is caused to function as: means for creating data of a header area attached to the data area at a head of the data to be communicated; means for creating data of a header authentication data area based on data that is contained in the header area and a first algorithm with which a given algorithm operation is performed on this data, the header authentication data area data being used for authentication of the header area; means for creating authentication data used for authentication of the data area and the header authentication data area, based on data that is contained in the data area and the header authentication data area and a second algorithm with which a given algorithm operation is performed on this data; and integrating means for integrating the digital information, the header area data, the header authentication data, and the authentication data to constitute the data area, the header area, the header authentication data area, and the authentication data area, respectively, with a header area placed at the head of the integrated data, and in which the means for creating data of the header area makes the header area data contain a second algorithm information that is information for identifying the second algorithm.

The above-mentioned device for creating the data with the data structure according to the second embodiment can be manufactured using the following computer program. That is, there is provided a computer program for causing a computer to function as a data processing device for processing data that has a data area for containing digital information as a substantial object of a communication, in which the computer is caused to function as: means for creating data of a header area attached to the data area at a head of the data to be communicated; means for creating data of a header authentication data area based on data that is contained in the header area and a first algorithm with which a given algorithm operation is performed on this data, the header authentication data area data being used for authentication of the header area; means for creating authentication data used for authentication of the data area, based on data that is contained in the data area and a second algorithm with which a given algorithm operation is performed on this data; and integrating means for integrating the digital information, the header area data, the header authentication data, and the authentication data to constitute the data area, the header area, the header authentication data area, and the authentication data area, respectively, with a header area placed at the head of the integrated data, and in which the means for creating data of the header area makes the header area data contain a second algorithm information that is information for identifying the second algorithm.

The above computer programs may be recorded in recording media.

The data with the data structure according to the first embodiment and the data with the data structure according to the second embodiment can be authenticated by, for example, devices described below.

The device for authenticating the data with the data structure according to the first embodiment is an authentication device that receives data having the data structure of the first embodiment and performs authentication on the data, including: a header authentication means for performing an algorithm operation on the header area with the use of a first algorithm, which is employed in the algorithm operation in creating the header area, and judging whether a result of the algorithm operation matches the header authentication data or not; and an authentication means for performing an algorithm operation on the data area and the header authentication data area with the use of a second algorithm that is identified from the second algorithm information contained in the header area, and judging whether a result of the algorithm operation matches the authentication data or not.

The device for authenticating the data with the data structure according to the second embodiment is an authentication device that receives data having the data structure of the second embodiment and performs authentication on the data, including: a header authentication means for performing an algorithm operation on the header area with the use of a first algorithm, which is employed in the algorithm operation in creating the header area, and judging whether a result of the algorithm operation matches the header authentication data or not; and an authentication means for performing an algorithm operation on the data area with the use of a second algorithm that is identified from the second algorithm information contained in the header area, and judging whether a result of the algorithm operation matches the authentication data or not.

The authentication means in the authentication devices may not carry out the algorithm operation when the header authentication device judges that a result of the algorithm operation performed on the header area using the first algorithm does not match the header authentication data.

The header authentication means may start the algorithm operation as soon as the header area and the header authentication data area are received in the case where data with the data structure according to the first embodiment or the second embodiment has the header authentication data area right behind the header area. In this case, the authentication devices may further include means for performing processing of discontinuing reception of data after the header authentication means judges that a result of the algorithm operation performed on the data by the header authentication means does not match the header authentication data. This means is expected to prevent troubles caused by receiving the entirety of data that is suspected of being altered, for example, troubles that a virus or other invalid codes contained in the data area may cause.

The data with the data structure according to the first embodiment and the data with the data structure according to the second embodiment can be authenticated by, for example, methods described below.

The method of authenticating the data with the data structure according to the first embodiment is an authentication method executed in an authentication device that receives data having the data structure of the first embodiment and performs authentication on the data, including the steps of: performing, by the authentication device, an algorithm operation on the header area with the use of a first algorithm, which is employed in the algorithm operation in creating the header area, and judging whether a result of the algorithm operation matches the header authentication data or not; and performing, by the authentication device, an algorithm operation on the data area and the header authentication data area with the use of a second algorithm that is identified from a second algorithm information contained in the header area, and judging whether a result of the algorithm operation matches the authentication data or not.

The method of authenticating the data with the data structure according to the second embodiment is an authentication method executed in an authentication device that receives data having the data structure of the second embodiment and performs authentication on the data, including the steps of: performing, by the authentication device, an algorithm operation on the header area with the use of a first algorithm, which is employed in the algorithm operation in creating the header area, and judging whether a result of the algorithm operation matches the header authentication data or not; and performing, by the authentication device, an algorithm operation on the data area with the use of a second algorithm that is identified from a second algorithm information contained in the header area, and judging whether a result of the algorithm operation matches the authentication data or not.

The above-mentioned devices which authenticate data with a data structure according to the first embodiment and data with a data structure according to the second embodiment may be dedicated devices. Alternatively, general-purpose computers can serve as these devices when, for example, computer programs described below are employed.

The above-mentioned device for creating the data with the data structure according to the first embodiment can be manufactured using the following computer program. That is, there is provided a computer program for causing a given computer to function as an authentication device that receives data having a data structure of the first embodiment and performs authentication on the data, in which the computer is caused to function as: a header authentication means for performing an algorithm operation on the header area with the use of a first algorithm, which is employed in the algorithm operation in creating the header area, and judging whether a result of the algorithm operation matches the header authentication data or not; and an authentication means for performing an algorithm operation on the data area and the header authentication data area with the use of a second algorithm that is identified from the second algorithm information contained in the header area, and judging whether a result of the algorithm operation matches the authentication data or not.

The above-mentioned device for creating the data with the data structure according to the second embodiment can be manufactured using the following computer program. That is, there is provided a computer program for causing a given computer to function as an authentication device that receives data having the data structure of the second embodiment and performs authentication on the data, in which the computer is caused to function as: a header authentication means for performing an algorithm operation on the header area with the use of a first algorithm, which is employed in the algorithm operation in creating the header area, and judging whether a result of the algorithm operation matches the header authentication data or not; and an authentication means for performing an algorithm operation on the data area with the use of a second algorithm that is identified from the second algorithm information contained in the header area, and judging whether a result of the algorithm operation matches the authentication data or not.

The above computer programs may be recorded in recording media.

BEST MODE FOR CARRYING OUT THE INVENTION

Detailed descriptions will be given with reference to the drawings on first through third preferred embodiments of the present invention.

The descriptions of the embodiments employ common symbols for common components, and redundant descriptions may be omitted.

First Embodiment

Figure 1:
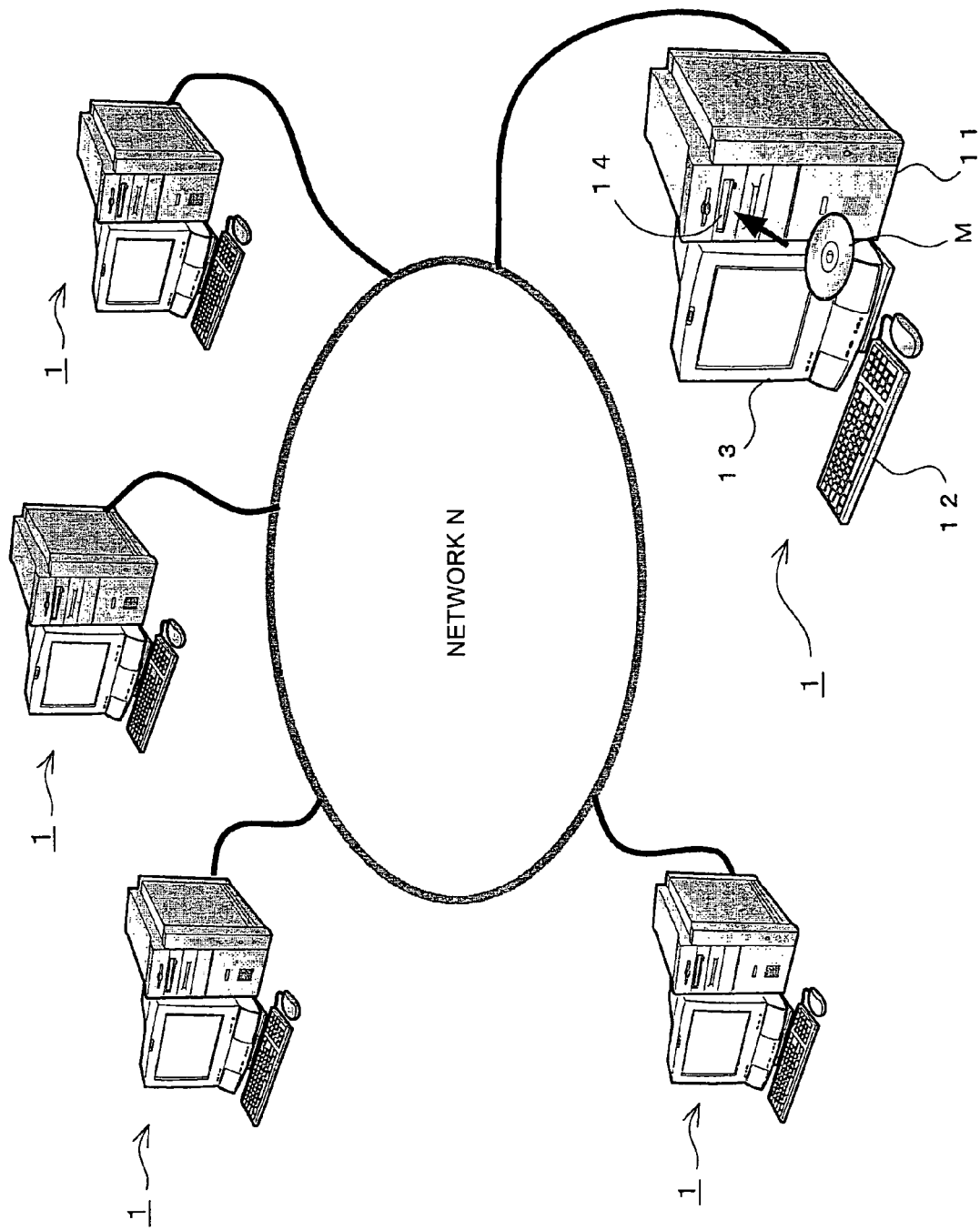
FIG. 1 is a schematic diagram showing an overall configuration of a communication system according to a first embodiment.

Described in the first embodiment is a communication system that is shown in FIG. 1 as terminals 1 connected to one another by a network N. The terminals 1 are capable of exchanging e-mail and the network N is, for example, the Internet.

The terminals 1 correspond to both a data processing device and an authentication device of the present invention. E-mail exchanged between the terminals 1 corresponds to data with a data structure according to the present invention. Each of the terminals 1 can create data about a piece of e-mail and can authenticate the received data.

A configuration of the terminals 1 is described.

The terminals 1 have basically the same configuration. Each terminal 1 has a general-purpose computer machine body 11 such as a common personal computer. The computer machine body 11 is connected to an input device 12, which is composed of a keyboard, a mouse and the like, and a display device 13 for displaying images.

The terminal 1 also has a disk drive 14 for reading given data or a computer program out of a recording medium M, which is, for example, a CD-ROM. The recording medium M shown in FIG. 1 records a computer program according to the present invention. The computer machine body 1 reads the computer program recorded in the recording medium M out of the recording medium M loaded into the disk drive 14. When installed, the computer program gives the computer machine body 11 functions of both the data processing device and data authentication device of the present invention.

The computer program may give the computer machine body 11 functions of both the data processing device and data authentication device of the present invention, alone or in cooperation with an OS installed in the computer, another computer program, or data.

Figure 2:
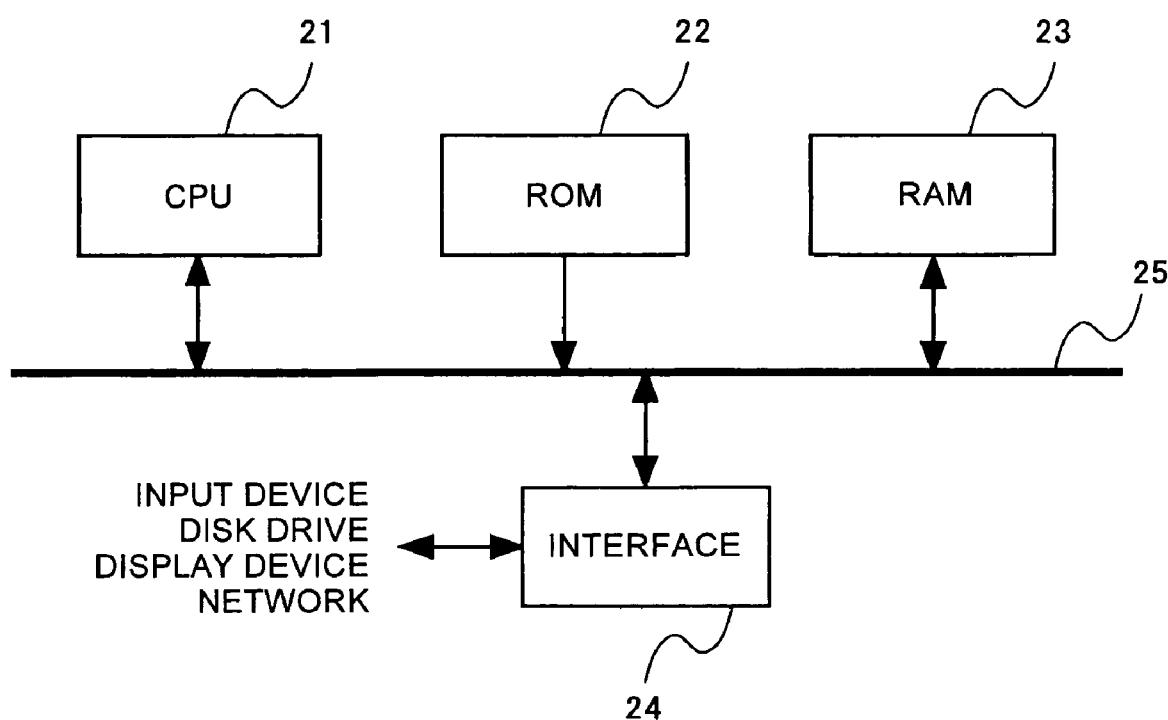
FIG. 2 is a schematic diagram showing a hardware configuration of a terminal shown in FIG. 1.

The computer machine body 11 contains, as shown in FIG. 2, a CPU (Central Processing Unit) 21, a ROM (Read Only Memory) 22, a RAM (Random Access Memory) 23, an interface 24, and a bus 25 which connects these components to one another.

The CPU 21 executes given processing by executing a given computer program.

The ROM 22 is a recording medium that stores a computer program for operating the CPU 21, data necessary for controlling the display device 13, and the like.

The RAM 23 provides a work area for the CPU 21 to process data.

The interface 24 functions as a port through which data is exchanged with the external. Through the interface 24, an input is made from the input device 12 and the disk drive 14 and an output of image data is made to the display device 13. The computer machine body 11 communicates with another terminal 1 through the interface 24 and the network N.

The CPU 21 incorporated in the terminal 1 of the present invention forms the following function blocks by executing the above-mentioned computer program.

Figure 3:
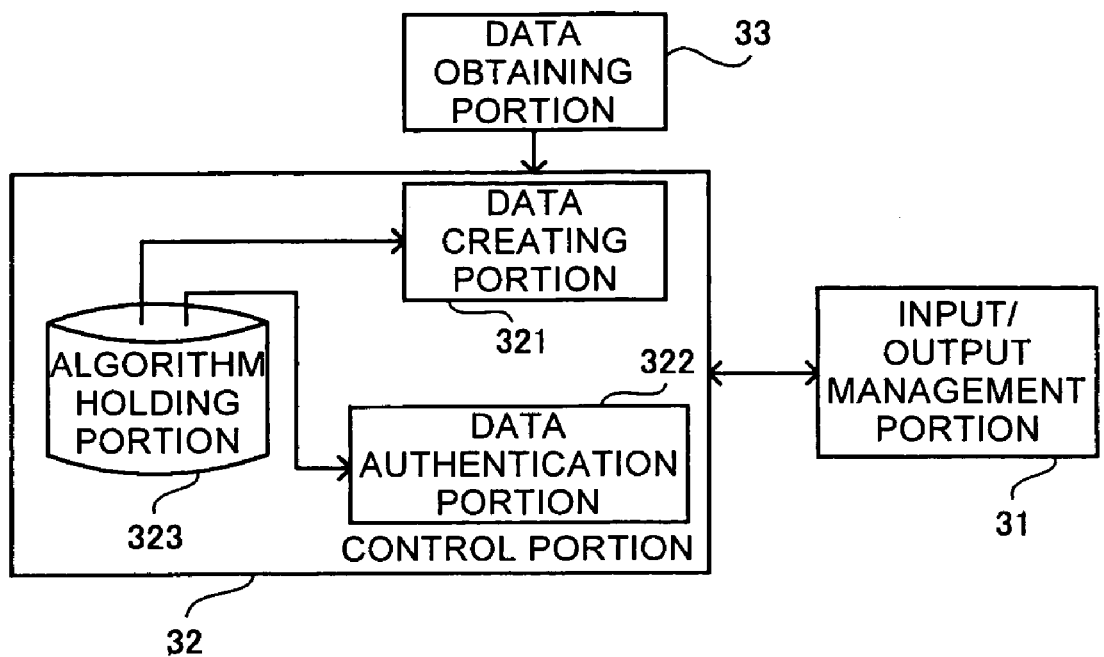
FIG. 3 is a block diagram showing function blocks formed inside the terminal shown in FIG. 1.

The function blocks formed include, as shown in FIG. 3, an input/output management portion 31, a control portion 32 and a data obtaining portion 33. The terminal 1 in this embodiment has a function of creating e-mail, but a description on this function will be omitted.

The input/output management portion 31 controls communications between the terminals 1 over the network N, and has a function of sending data to another terminal 1 or receiving data from another terminal 1.

The control portion 32 has a function of executing data creating processing and data authentication processing which will be described later.

The data obtaining portion 33 obtains, when the control portion 32 executes data creating processing, digital information that is a substantial object of the transmission from another component of the terminal 1. The data obtaining portion 33 sends the digital information as a substantial object of the transmission to the control portion 32, more specifically, to a data creating portion 321.

The control portion 32 has the data creating portion 321, a data authentication portion 322 and an algorithm holding portion 323.

The data creating portion 321 has a function of creating transmission data by executing data creating processing, which will be described later, using digital information that is sent from the data obtaining portion 33.

The data authentication portion 322 performs data authentication processing, which will be described later, on data that is received by the input/output management portion 31 from another terminal 1.

The algorithm holding portion 323 records information about an algorithm used by the data creating portion 321 or the data authentication portion 322 when the data creating processing or the data authentication processing is executed. Plural algorithms are recorded in the algorithm holding portion 323 in a state shown in FIG. 4. Algorithm 1, Algorithm 2, Algorithm 3 . . . represent the recorded algorithms.

Figure 4:
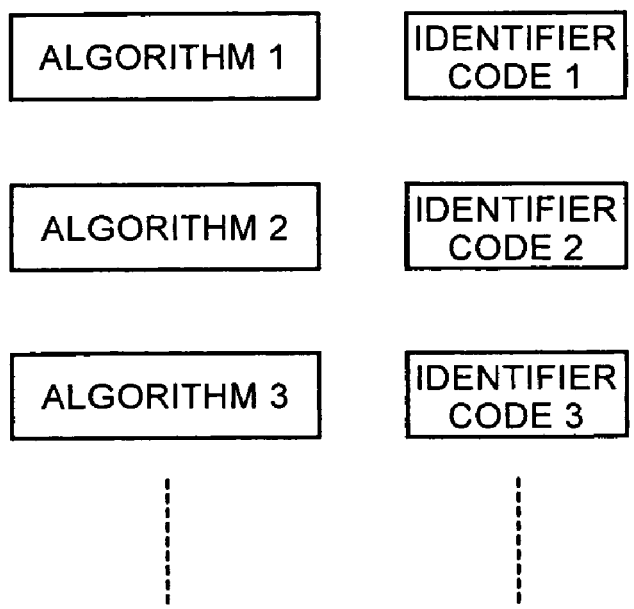
FIG. 4 is a conceptual diagram showing contents of data recorded in an algorithm holding portion shown in FIG. 3.

Identifier codes are also recorded in the algorithm holding portion 323 in a state shown in FIG. 4. Identifier Code 1, Identifier Code 2, Identifier Code 3 . . . represent the recorded identifier codes. An identifier code is associated with an algorithm denoted by the same number, so that once the identifier code is identified, the algorithm denoted by the same number as the identifier code is identified. The data size of an identifier code is much smaller than that of an algorithm.

Figure 5:
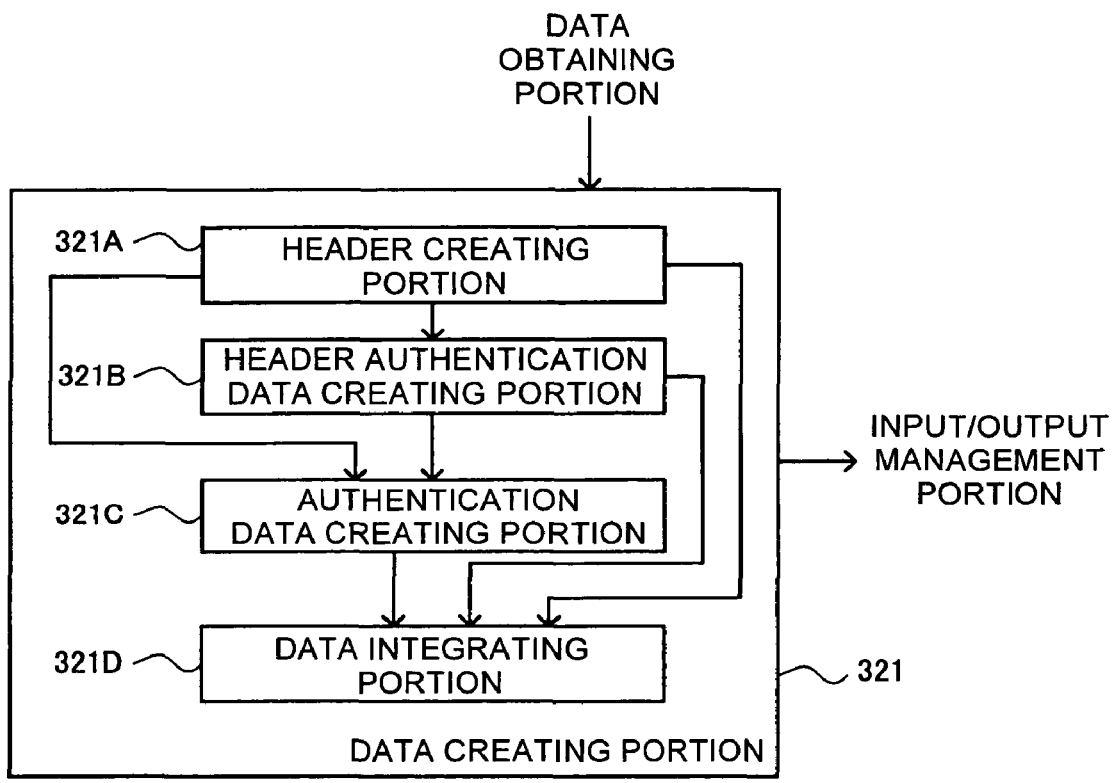
FIG. 5 is a function block diagram showing an interior of a data creating portion shown in FIG. 3.

The data creating portion 321 is as shown in FIG. 5.

The data creating portion 321 has a header creating portion 321A, a header authentication data creating portion 321B, an authentication data creating portion 321C, and a data integrating portion 321D.

The header creating portion 321A creates, when transmitting digital information that is received by the data creating portion 321 from the data obtaining portion 33, data about a header attached to a data area, which is an area containing the digital information to be transmitted. Header area data contains information about the sender terminal 1, the address of the receiver terminal 1, an identifier code as the one described above, and the like, which will be described later. The data about the header later constitutes a header area.

The header authentication data creating portion 321B has a function of creating header authentication data, which is needed when the terminal 1 receiving the created data executes header area authentication processing. The header authentication data later constitutes a header authentication data area.

The authentication data creating portion 321C creates authentication data, which is needed when the terminal 1 receiving the created data executes authentication processing of the header authentication data area and the data area. The authentication data later constitutes an authentication data area.

The data integrating portion 321D combines digital information received from the data obtaining portion 33 with header data created by the header creating portion 321A, header authentication data created by the header authentication data creating portion 321B, and authentication data created by the authentication data creating portion 321C, to thereby make them into a sequence of data. In this data, the digital information constitutes the data area, the header data constitutes the header area, the header authentication data constitutes the header authentication data area, and the authentication data constitutes the authentication data area.

The thus created data is transferred to the input/output management portion 31 to be sent to another terminal 1 that is indicated by the address written in the header area.

Figure 6:
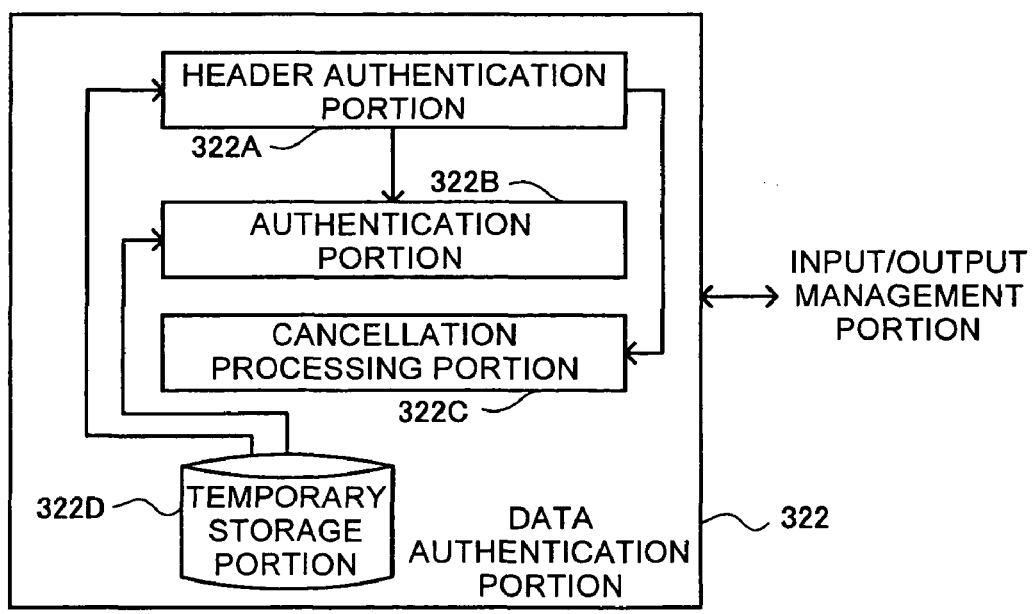
FIG. 6 is a function block diagram showing an interior of a data authentication portion shown in FIG. 3.

The data authentication portion 322 is as shown in FIG. 6.

The data authentication portion 322 has a header authentication portion 322A, an authentication portion 322B, a cancellation processing portion 322C and a temporary storage portion 322D.

The temporary storage portion 322D has a function of receiving, from the input/output management portion 31, data that is sent from another terminal 1 to be authenticated and temporarily storing the received data.

The header authentication portion 322A has a function of authenticating validity of the header area. The header authentication portion 322A reads header data area and header authentication data area data among data recorded in the temporary storage portion 322D, and performs the authentication.

The authentication portion 322B has a function of authenticating the validity of the data area and the header authentication data area. The authentication portion 322B reads header area data, header authentication data area data, data area data, and authentication data area data among data recorded in the temporary storage portion 322D, and performs the authentication.

The cancellation processing portion 322C has a function of deciding to perform processing of discontinuing reception of data after the header authentication portion 322A judges that the data contains an invalid header area. When the cancellation processing portion 322C decides to carry out the processing, information about the decision is sent to the input/output management portion 31. Receiving the information, the input/output management portion 31 discontinues the reception of the data that has the invalid header area if the reception of the data is still in progress.

Described next is an operation of the terminals 1 in this communication system.

As described above, the terminals 1 exchange e-mail with one another in this communication system. The terminal 1 that sends e-mail creates e-mail data (data creating processing), and the terminal 1 that receives e-mail performs authentication on the e-mail data (data authentication processing).

The data creating processing and the data authentication processing are described below.

[Data Creating Processing]

Figure 7:
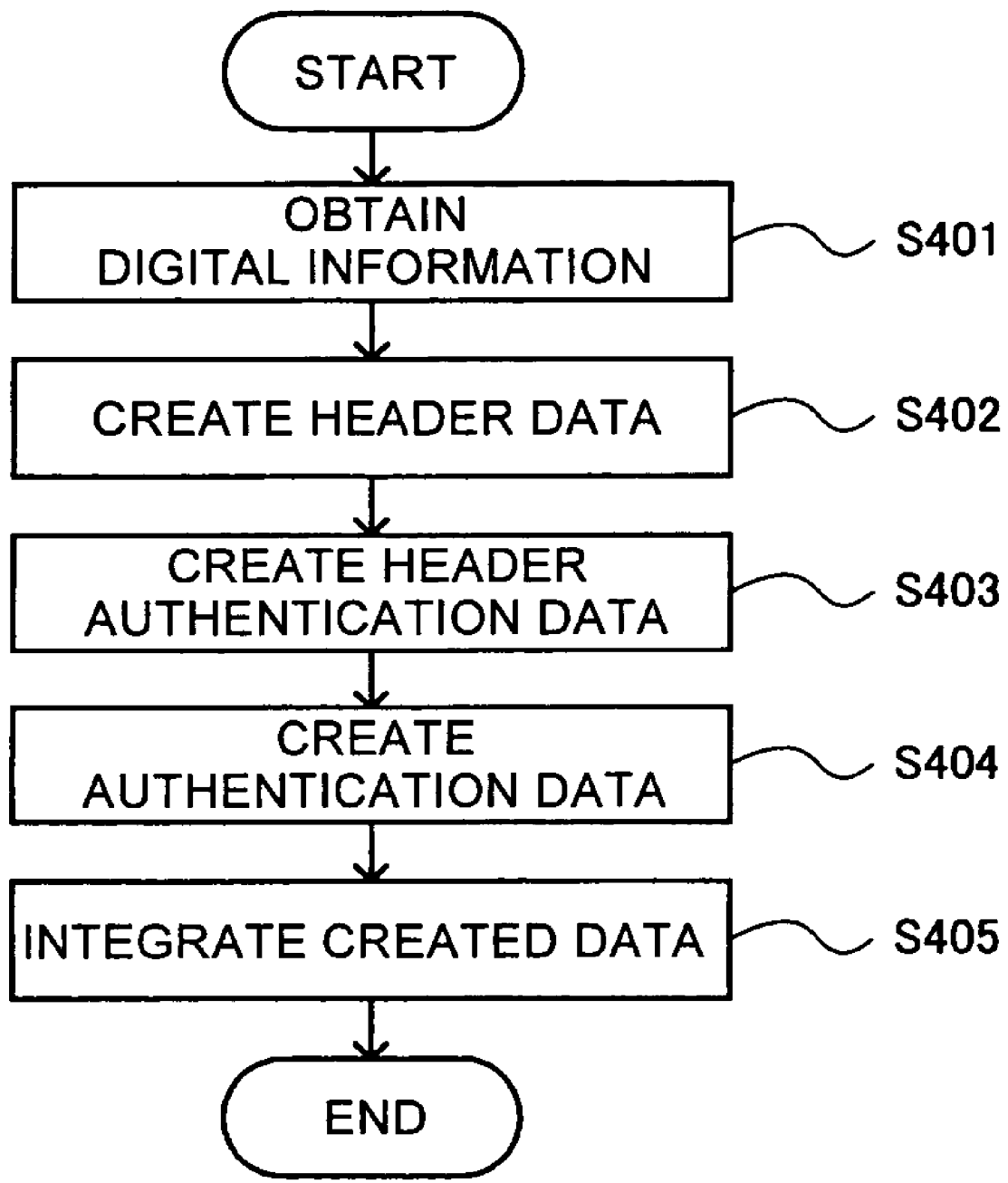
FIG. 7 is a flow chart showing a processing flow of data creating processing, which is executed by the data creating portion of the terminal shown in FIG. 1.

FIG. 7 shows a flow of processing executed by the data creating portion 321 in the data creating processing.

The data creating processing is performed upon transmission of e-mail in this embodiment.

When a user creates e-mail contents by operating the input device 12 of the terminal 1, digital information about the e-mail contents is created. The digital information is the substantial object of the transmission.

First, the data creating portion 321 obtains the digital information from the data obtaining portion 33, which has obtained the digital information as the substantial object of the transmission (S401). The digital information equals the data area.

Next, the header creating portion 321A creates the header data (S402). The header data later constituting the header area contains information about the sender terminal 1 and the address of the receiver terminal 1. The header data also contains information about the length of the authentication data and an identifier code associated with an algorithm that is used in authentication data creation, which will be described later. In this embodiment, the header creating portion 321A selects, from algorithms recorded in the algorithm holding portion 323, an algorithm that is used in creating the header authentication data and an algorithm that is used in creating the authentication data, and buries in the header area an identifier code associated with the algorithm that is used in creating the authentication data. Identifier Code 2 is contained, in this embodiment, in respective header data as the identifier code associated with the algorithm that is used in creating the authentication data. In this embodiment, Algorithm 1 is always used in creating the header authentication data. This information is shared among the terminals 1.

The header creating portion 321A sends, to the header authentication data creating portion 321B, information about which algorithm should be used in creating the header authentication data and sends, to the authentication data creating portion 321C, information about which algorithm is used in creating the authentication data.

In this embodiment, every header area (header data) created has a predetermined size. Information about the header area size is shared among the terminals 1 in this embodiment.

The header creating portion 321A sends the created header area data to the header authentication data creating portion 321B and to the data integrating portion 321D.

Next, the header authentication data creating portion 321B creates the header authentication data (S403).

The header authentication data creating portion 321B receives, prior to creating the header authentication data, from the header creating portion 321A, information about which algorithm should be used in creating the header authentication data and the created header data. Based on the received information and header data, the header authentication data creating portion 321B creates the header authentication data.

To be more specific, the header authentication data creating portion 321C reads, out of the algorithm holding portion 323, an algorithm that is specified by the received identifier code (Algorithm 1 in this embodiment), and performs an algorithm operation on the received header area using the read algorithm. The header authentication data is created as a result of the algorithm operation. The created header authentication data is sent to the authentication data creating portion 321C and to the data integrating portion 321D.

The algorithm operation can be any operation specified by an algorithm. Known methods such as CBC-MAC (Cipher Block Chaining-Message Authentication Code) may be employed, and a new calculation method may also be employed.

Figure 8A:
FIGS. 8A to 8C are conceptual diagrams showing an example of a header authentication data creating method.
Figure 8B:
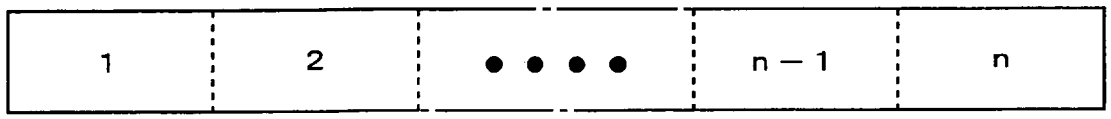
Figure 8C:
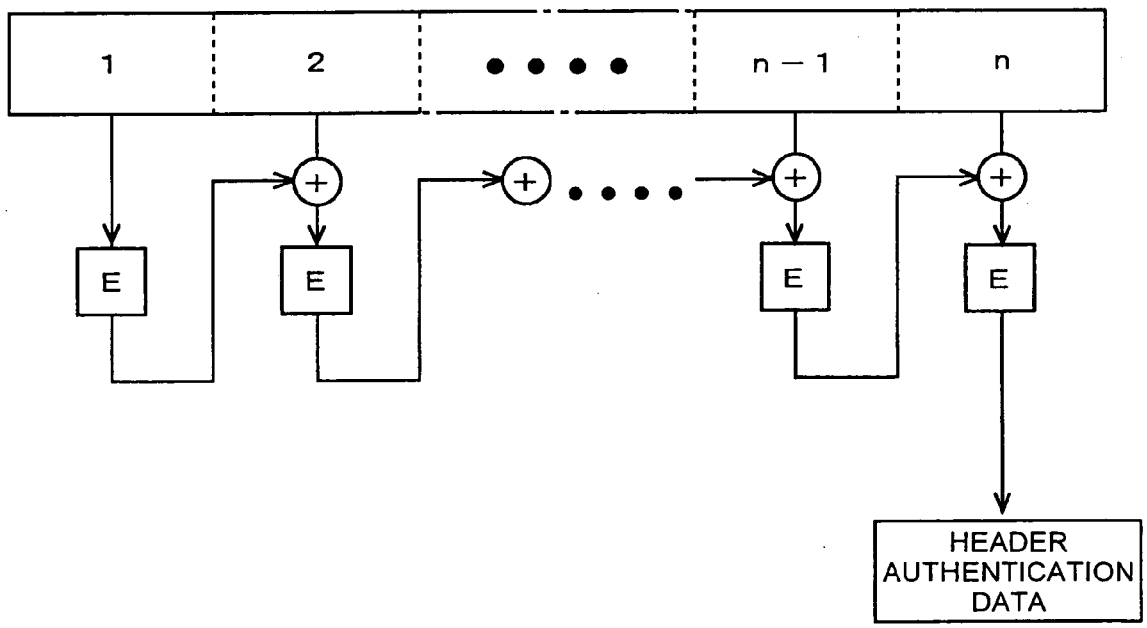

In this embodiment, the algorithm operation is performed as shown in FIGS. 8A to 8C.

In this embodiment, first, header data shown in FIG. 8A is equally divided into n parts as shown in FIG. 8B. Next, as shown in FIG. 8C, a specific calculation (denoted by "E" in the drawing; usually block encryption such as DES and AES is used) is performed on the divided data, starting from the front of the header data, and the result of the specific calculation is added (denoted by "+" in the drawing) to the next part of the divided data before performing the specific calculation again and adding the result of the specific calculation to the subsequent part of the divided data. This is repeated until the n-th part of the data. The final result is header authentication data.

Next, the authentication data creating portion 321C creates authentication data (S404).

Prior to creating authentication data, the authentication data creating portion 321C receives from the header creating portion 321A information about which algorithm should be used in creating authentication data. The authentication data creating portion 321C also receives in advance the created header authentication data from the header authentication data creating portion 321B and the digital information constituting the data area from the data obtaining portion 33.

Based on the received information and header authentication data, the authentication data creating portion 321C creates the authentication data area.

To be more specific, the authentication data creating portion 321C reads, out of the algorithm holding portion 323, an algorithm that is specified by the received identifier code (Algorithm 2 in this embodiment), and uses the read algorithm in performing an algorithm operation on a combination of the received header authentication data and digital information. Authentication data is created as a result of the algorithm operation.

The algorithm operation can be any operation specified by an algorithm as in the above case.

The created authentication data is sent to the data integrating portion 321D.

Next, the data integrating portion 321D integrates the data (S405).

The data integrating portion 321D receives in advance the digital information from the data obtaining portion 33, the header data from the header creating portion 321A, the header authentication data from the header authentication data creating portion 321B, and authentication data from the authentication data creating portion 321C.

Figure 9:
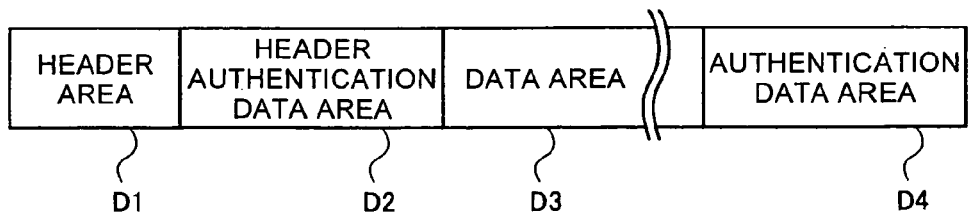
FIG. 9 is a conceptual diagram showing a data structure of data created by the terminal.

The data integrating portion 321D integrates the received data into a sequence of data to be communication data. The digital information constitutes the data area, the header data constitutes the header area, the header authentication data constitutes the header authentication data area, and the authentication data constitutes the authentication data area. This transmission data is as shown in FIG. 9, and has a header area D1 at the head, and subsequently a header authentication data area D2, a data area D3 and an authentication data area D4 in the order stated.

This data is transferred to the input/output management portion 31 to be sent to another terminal 1 via the network N.
[Data Authentication Processing]

Figure 10:
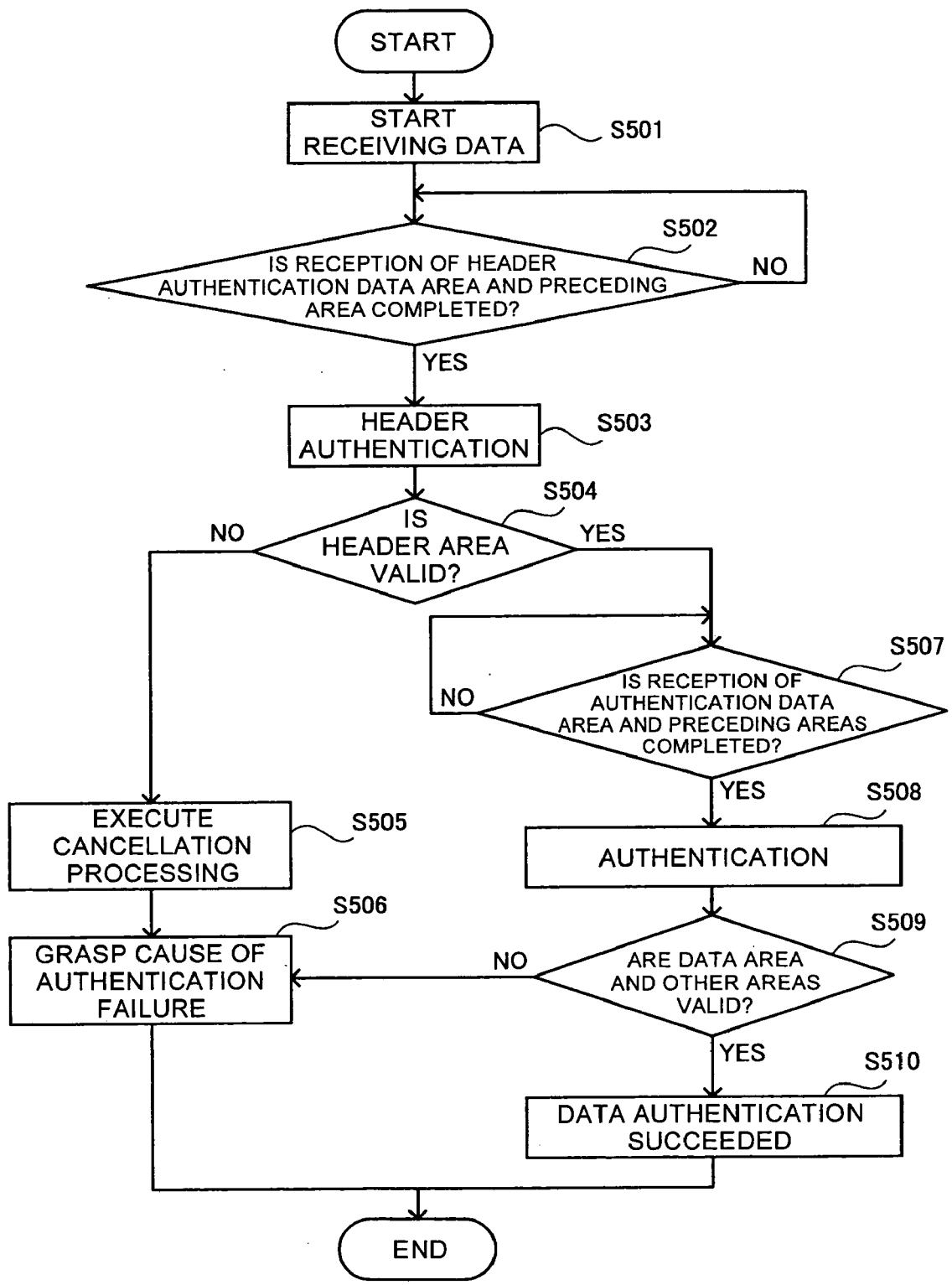
FIG. 10 is a flow chart showing the processing flow of data authentication processing, which is executed by the data authentication portion of the terminal shown in FIG. 1.

FIG. 10 shows the flow of processing executed by the data authentication portion 322 as the data authentication processing.

The data authentication processing is executed upon e-mail reception in this embodiment. For convenience of explanation, e-mail received here is the data described in the [Data Creating Processing] section.

When the terminal 1 receives e-mail from another terminal 1, data about the received e-mail is sent to the data authentication portion 322 through the input/output management portion 31. This causes the data authentication portion 322 to start receiving the data (S501).

The data started to be received is temporarily stored in the temporary storage portion 322D. The data is received sequentially from the left hand side of the data structure shown in FIG. 9 and recorded in the temporary storage portion 322D sequentially from the left hand side of the data structure shown in FIG. 9.

Next, the header authentication portion 322A performs header authentication. Header authentication may be carried out after the entirety of data is received. In this embodiment, however, header authentication is started before the reception of the data is completed, more specifically, as soon as the header area D1 and the header authentication data area D2 are received (and recorded in the temporary storage portion 322D).

The header authentication portion 322A of this embodiment therefore monitors for whether or not the header area D1 and the header authentication data area D2 have been received, in other words, whether or not the recording of the header area D1 and the header authentication data area D2 in the temporary storage portion 322D has been completed (S502).

When the header authentication data area D2 finishes being recorded in the temporary storage portion 322D (S502: YES), the header authentication portion 322A starts header authentication (S503). In the case where the recording of the header authentication data area D2 in the temporary storage portion 322D has not been completed (S502: NO), the header authentication portion 322A continues the monitoring described above.

Header authentication is performed as follows.

The header authentication portion 322A reads out of the algorithm holding portion 323 Algorithm 1 as an algorithm used in authentication of the header area. The terminals 1, which share information that Algorithm 1 should be used as an algorithm for creating header authentication data as mentioned above, also share information that Algorithm 1 should be used in header authentication performed on the header area. The header authentication portion 322A also reads the header area D1 and the header authentication data area D2 out of the temporary storage portion 322D.

Upon completion of the reading, the header authentication portion 322A performs an operation specified by Algorithm 1 on the header area. The algorithm operation is performed the same way as in the header authentication data creation described in the [Data Creating Processing] section. In the case where the header area D1 has not been altered and no data is missing, the result of the algorithm operation performed on the header area matches the header authentication data.

The header authentication portion 322A judges whether the header area D1 is valid or not from whether or not the two are a match (S504).

If it is judged that the header area D1 is invalid (S504: NO), the header authentication portion 322A informs the cancellation processing portion 322C of the fact. Informed of the fact, the cancellation processing portion 322C performs cancellation processing (S505). The cancellation processing is for discontinuing reception of data containing the header area D1 that is authenticated unsuccessfully in header authentication. The cancellation processing portion 322C informs the input/output management portion 31 of the fact that the cancellation processing is executed. The input/output management portion 31 discontinues the reception of the data at this point if the reception of the data is still in progress. When the header area D1 is invalid, there is a high risk that an invalid code is contained in the data area D3. Discontinuing reception of data in this manner increases the chance of avoiding troubles that result from receiving invalid codes.

When the header authentication portion 322A judges that the header area D1 is invalid (S504: NO), this information is sent also to the authentication portion 322B. The authentication portion 322B understands that the authentication failure is due to unsuccessful authentication of the header area D1 (S506).

If it is judged that the header area D is valid (S504: YES), the header authentication portion 322A informs the authentication portion 322B of the fact.

This causes the authentication portion 322B to carry out authentication of the header authentication data area D2 and the data area D3.

In this embodiment, the authentication portion 322B starts the authentication when reception of the entire data is completed, in other words, after the authentication data area D4 is received (and recorded in the temporary storage portion 322D).

The authentication portion 322B of this embodiment therefore monitors for whether reception of the entirety of data has been completed or not, in other words, whether or not the authentication data area D4 has finished being recorded in the temporary storage portion 322D (S507).

When the authentication data area D4 finishes being recorded in the temporary storage portion 322D (S507: YES), the authentication portion 322B starts header authentication (S508). In the case where the recording of the authentication data area D4 in the temporary storage portion 322D has not been completed (S507: NO), the authentication portion 322B continues the monitoring described above.

Prior to performing the authentication, the authentication portion 322B reads the header authentication data area D2, the data area D3 and the authentication data area D4 out of the temporary storage portion 322D. The authentication portion 322B also reads out of the header area D1 an identifier code as information for specifying which algorithm the authentication portion 322B is used to perform the authentication. The read identifier code is associated with Algorithm 2 as mentioned above.

Upon completion of the reading, the authentication portion 322B performs an operation specified by Algorithm 2, which is associated with the identifier code, on the header authentication data area D2 and the data area D3. For this algorithm operation, an algorithm associated with the identifier code is read out of the algorithm holding portion 323. The algorithm operation is performed the same way as in the authentication data creation described in the [Data Creating Processing] section. In the case where the header authentication data area D2 and the data area D3 have not been altered and no data is missing, the result of the algorithm operation matches the authentication data.

The authentication portion 322B judges whether the header authentication data area D2 and the data area D3 are valid or not from whether or not the result matches the authentication data (S509).

In the case where the authentication portion 322B judges that the header authentication data area D2 and the data area D3 are invalid (S509: NO), the authentication portion 322B grasps that the authentication failure is due to the fact that the header authentication data area D2 or the data area D3 is invalid (S506).

If it is judged that the header authentication data area D2 and the data area D3 are valid (S509: YES), the authentication portion 322B determines that the authentication of the data is a complete success (S510).

The data authentication processing is thus ended.

In this embodiment, the authentication portion 322B grasps the cause of an authentication failure as described above. This can be utilized in performing the data authentication processing again, and is also effective as data for statistically examining authentication failure patterns.

The terminal 1 in this embodiment has functions of both the data processing device and authentication device of the present invention.

Alternatively, the terminal 1 may have only one of the data processing device function and the authentication device function. In this case, the terminal 1 that functions only as the data processing device does not have the data authentication portion 322 out of the function blocks of the above terminal 1 whereas the terminal 1 that functions only as the authentication device does not have the data creating portion 321 out of the function blocks of the above terminal 1.

Second Embodiment

The terminals 1 according to a second embodiment are substantially the same as the terminals 1 in the first embodiment. In the second embodiment too, the terminals 1 can exchange e-mail with one another and are connected to one another via the network N, which is, for example, the Internet, to constitute the communication system shown in FIG. 1.

The terminals 1 according to the second embodiment correspond to both the data processing device and authentication device of the present invention. E-mail exchanged between the terminals 1 corresponds to data with a data structure according to the present invention. Each of the terminals 1 can create data about a piece of e-mail and can authenticate the data received.

Each terminal 1 has the same configuration as in the first embodiment. The terminal 1 of the second embodiment has the hardware configuration shown in FIG. 2 as does the terminal 1 of the first embodiment. The terminal 1 of the second embodiment, too, obtains the functions of both the data processing device and authentication device of the present invention by reading a computer program out of the given recording medium M.

By executing the above computer program, the CPU 21 contained in the terminal 1 of the second embodiment forms the same function blocks as those in the first embodiment.

The function blocks formed in the second embodiment are as shown in FIG. 3 as in the first embodiment.

What make the second embodiment different from the first embodiment are functions of the authentication data creating portion 321C and the authentication portion 322B.

A description is given below on functions of the authentication data creating portion 321C and the authentication portion 322B that are formed in the terminal 1 of the second embodiment.

The authentication data creating portion 321C that is formed in the terminal 1 of the second embodiment creates authentication data based on digital information, unlike the case of the first embodiment.

The authentication data creating portion 321C in the terminal 1 of the second embodiment reads, prior to creating authentication data, out of the header creating portion 321A, which algorithm should be used in creating authentication data. The authentication data creating portion 321C also receives in advance digital information constituting the data area from the data obtaining portion 33. Based on the received information, the authentication data creating portion 321C creates authentication data.

To be more specific, the authentication data creating portion 321C reads out of the algorithm holding portion 323 an algorithm that is specified by the received identifier code, and performs an algorithm operation on the data area received in advance by using the read algorithm. Authentication data is created as a result of the algorithm operation.

Next, the authentication portion 322B formed in the terminal 1 of the second embodiment is described.

The authentication portion 322B in the second embodiment performs authentication on the data area out of the areas of the received data, instead of the header authentication data area and the data area as in the first embodiment.

Prior to performing the authentication, the authentication portion 322B in the second embodiment reads out of the header area an identifier code as information for specifying which algorithm the authentication portion 322B uses to perform authentication on the data area D3. The authentication portion 322B also reads the data area D3 and the authentication data area D4 out of the temporary storage portion 322D.

Upon completion of the reading, the authentication portion 322B performs an operation specified by the algorithm that is associated with the identifier code. For this algorithm operation, an algorithm associated with the identifier code is read out of the algorithm holding portion 323. In the case where the data area D3 has not been altered and no data is missing, the result of the algorithm operation matches the authentication data.

The authentication portion 322B judges whether the data area D3 is valid or not from whether or not the result matches the authentication data.

The overall processing flow of data creating processing and data authentication processing executed in the terminal 1 of the second embodiment is the same as in the first embodiment.

Third Embodiment

The terminals 1 according to a third embodiment are substantially the same as the terminals 1 in the first embodiment. In the third embodiment too, the terminals 1 can exchange e-mail with one another and are connected to one another via the network N, which is, for example, the Internet, to constitute the communication system shown in FIG. 1.

The terminals 1 according to the third embodiment correspond to both the data processing device and authentication device of the present invention. E-mail exchanged between the terminals 1 corresponds to data with a data structure according to the present invention. Each of the terminals 1 can create data about a piece of e-mail and can authenticate the data received.

Each terminal 1 has the same configuration as in the first embodiment. The terminal 1 of the third embodiment has the hardware configuration shown in FIG. 2 as does the terminal 1 of the first embodiment. The terminal 1 of the third embodiment, too, obtains the functions of both the data processing device and authentication device of the present invention by reading a computer program out of the given recording medium M.

Executing the above computer program, the CPU 21 contained in the terminal 1 of the third embodiment forms the same function blocks as those in the first embodiment.

The function blocks formed in the third embodiment are as shown in FIG. 3 as in the first embodiment.

The third embodiment differs from the first embodiment in that the terminals 1 in the third embodiment do not share information about which algorithm should be used as an algorithm for creating header authentication data and information about which algorithm should be used in header authentication performed on the header area.

This difference gives the header creating portion 321A and header authentication portion 322A of the terminal 1 in the third embodiment functions that are different from those of the terminal 1 in the first embodiment.

A description is given below on functions of the header creating portion 321A and the header authentication portion 322A that are formed in the terminal 1 of the third embodiment.

The header creating portion 321A formed in the terminal 1 of the third embodiment makes header area data contain, in addition to the aforementioned information, an identifier code for specifying which algorithm is used in creating header authentication data.

The header authentication portion 322A formed in the terminal 1 of the third embodiment reads, in performing header authentication, out of the header area data, the identifier code for specifying which algorithm is used in performing authentication of the header area. The header authentication portion 322A also reads out of the algorithm holding portion 323 an algorithm that is identified by the read identifier code, and performs an operation specified by the algorithm on the header area data.

The overall processing flow of data creating processing and data authentication processing executed in the terminal 1 of the third embodiment is the same as in the first embodiment.

The invention claimed is:

1. A non-transitory, computer readable recording medium having stored thereon data to be communicated in a communication, comprising:
   at least one data structure having at least the following distinct areas:
   a data area for containing digital information that is a substantial object of the communication;
   a header area attached to the data area at a head of the data to be communicated;
   a header authentication data area for containing header authentication data used for authentication of the header area, the header authentication data area is created based on data comprised in the header area and a first algorithm with which a first algorithm operation is performed on the data within the header area; and
   an authentication data area for containing authentication data used for authentication of the data area and the header authentication data area, the authentication data area is created by performing a second algorithm operation on data contained in the data area and the header authentication data area,
   wherein the header area contains a second algorithm information for identifying a second algorithm which is different from the first algorithm and is used to authenticate the data area using the authentication data.

2. The recording medium according to claim 1, wherein the header area contains information about a data length of the data area.

3. The recording medium according to claim 1, wherein the header area contains a first algorithm information that is information for identifying an algorithm for a given algorithm operation that is performed to authenticate the header area using the header authentication data.

4. The recording medium according to claim 1, wherein the header authentication data area is placed immediately behind the header area.

5. An authentication device that receives data and performs authentication on the data, comprising:
at least a processor executing at least the following means:
a header authentication means for authenticating a header area by performing a first algorithm operation on the header area with a first algorithm, and judging whether a result of the first algorithm operation matches a header authentication data or not; and
an authentication means for performing a second algorithm operation on a data area and a header authentication data area with a second algorithm that is different from the first algorithm and identified from second algorithm information contained in the header area, and judging whether a result of the second algorithm operation matches the authentication data or not,
wherein the received data has a data structure comprising:
the header area at a head of the received data;
a header authentication data area for containing the header authentication data used for authentication of the header area, the header authentication data area is created based on data comprised in the header area and a first algorithm with which a first algorithm operation is performed on the data within the header area;
the data area containing digital information that is a substantial object of a received communication;
an authentication data area for containing authentication data used for authentication of the data area and the header authentication data area, the authentication data area is created by performing a second algorithm operation on data contained in the data area and the header authentication data area.

6. The authentication device according to claim 5, wherein the authentication means does not carry out the second algorithm operation when the header authentication means judges that a result of the first algorithm operation performed on the header area based on the first algorithm does not match the header authentication data.

7. The authentication device according to claim 6, wherein, in a case where the header authentication data area is placed immediately behind the header area, the header authentication means starts the first algorithm operation as soon as the header area and the header authentication data area are received, and wherein the authentication device further comprises means for performing processing of discontinuing reception of data after the header authentication means judges that a result of the first algorithm operation performed on the header area of the data does not match the header authentication data.

8. An authentication method executed in an authentication device that performs authentication of received data, comprising the steps of:
storing, at the authentication device, data having a data structure comprising at least the following exclusive areas:
a header area at a head of the received data;
a header authentication data area for containing header authentication data used for authentication of the header area, the header authentication data area is created based on data comprised in the header area and a first algorithm with which a first algorithm operation is performed on data within the header area;
a data area containing digital information that is a substantial object of a received communication;
an authentication data area for containing authentication data used for authentication of the data area and the header authentication data area, the authentication data area is created by performing a second algorithm operation on data contained in the data area and the header authentication data area,
performing, by the authentication device, a first algorithm operation on the header area with the use of a first algorithm, and judging whether a result of the algorithm operation matches the header authentication data or not; and
performing, by the authentication device, a second algorithm operation on the data area and the header authentication data area with a second algorithm which is different from the first algorithm and which is identified from a second algorithm information contained in the header area, and judging whether a result of the second algorithm operation matches the authentication data or not.

9. A non-transitory, processor readable storage medium having stored thereon a computer program for causing a given computer to function as an authentication device wherein the computer is caused to function as:
a receiving means that receives data having a data structure comprising at least the following exclusive areas:
a header area at a head of the received data;
a header authentication data area for containing header authentication data used for authentication of the header area, the header authentication data area is created based on data comprised in the header area and a first algorithm with which a first algorithm operation is performed on data within the header area;
a data area containing digital information that is a substantial object of a received communication;
an authentication data area for containing authentication data used for authentication of the data area and the header authentication data area, the authentication data area is created by performing a second algorithm operation on data contained in the data area and the header authentication data area,
a header authentication means for performing a first algorithm operation on the header area with the use of a first algorithm, and judging whether a result of the first algorithm operation matches the header authentication data or not; and
an authentication means for performing a second algorithm operation on the data area and the header authentication data area with a second algorithm which is different from the first algorithm and identified from second algorithm information contained in the header area, and judging whether a result of the second algorithm operation matches the authentication data or not.

10. A data processing device for processing data that has a data area for containing digital information as a substantial object of a communication, comprising:
means for storing the digital information;
means for creating data of a header area attached to the data area at a head of the data to be communicated;

means for creating data of a header authentication data area based on data in the header area and a first algorithm with which a first algorithm operation is performed on the data in the header area, the header authentication data area data being used for authentication of the header area;

means for creating authentication data used for authentication of the data area and the header authentication data area, based on data in the data area and the header authentication data area and a second algorithm with which a second algorithm operation is performed on the data of the data area and the header authentication data area; and integrating means for integrating the digital information, the header area data, the header authentication data, and the authentication data to constitute a data structure that comprises distinct areas which include the data area, the header area, the header authentication data area, and the authentication data area, respectively, with the header area placed at a head of the integrated data, wherein the means for creating data of the header area includes in the header area data, contain a identification information of the second algorithm which is different from the first algorithm.

11. The data processing device according to claim 10, wherein the integrating means places the header authentication data area immediately behind the header area.

12. The data processing device according to claim 10, wherein the means for creating data of the header area creates the header area data in a specific size.

13. A data processing method executed in a data processing device for processing data that has a data area for containing digital information as a substantial object of a communication, comprising the steps of:

creating, by the data processing device, data of a header area attached to the data area at a head of the data to be communicated;

creating, by the data processing device, data of a header authentication data area based on data that is contained in the header area and a first algorithm with which a first algorithm operation is performed on this data, the header authentication data area data being used for authentication of the header area;

creating, by the data processing device, authentication data used for authentication of the data area and the header authentication data area, based on data that is contained in the data area and the header authentication data area and a second algorithm with which a second algorithm operation is performed on this data; and integrating, by the data processing device, the digital information, the header area data, the header authentication data, and the authentication data to constitute a data structure that comprises distinct areas which include the data area, the header area, the header authentication data area, and the authentication data area, respectively, with the header area placed at a head of the integrated data, wherein, in the step of creating data of the header area, a second algorithm information that is information for identifying the second algorithm which is different from the first algorithm is contained in the header area data.

14. A non-transitory, computer readable recording medium having stored thereon a computer program for causing a computer to function as a data processing device for processing data that has a data area for containing digital information as a substantial object of a communication, wherein the computer is caused to function as:

means for creating data of a header area attached to the data area at a head of the data to be communicated;

means for creating data of a header authentication data area based on data that is contained in the header area and a first algorithm with which a given algorithm operation is performed on this data, the header authentication data area data being used for authentication of the header area;

means for creating authentication data used for authentication of the data area, based on data that is contained in the data area and a second algorithm with which a given algorithm operation is performed on this data; and integrating means for integrating the digital information, the header area data, the header authentication data, and the authentication data to constitute the data area, the header area, the header authentication data area, and the authentication data area, respectively, with a header area placed at the head of the integrated data, and wherein the means for creating data of the header area makes the header area data contain a second algorithm information that is information for identifying the second algorithm which is different from the first algorithm and the data has a data structure which distinctly holds in respective areas data of the header area, the header authentication data area, the data area and the authentication data area.

15. The method of claim 13, wherein the data processing device exchanges information regarding the first algorithm with a receiver of the data.

* * * * *